Oct. 26, 1965  J. H. WORTHEN  3,213,625
PRECISION ADJUSTING APPARATUS
Filed June 4, 1964  4 Sheets-Sheet 1

FIG. I

INVENTOR.
JOHN H. WORTHEN
BY
Brumbaugh, Free, Graves + Donohue
his ATTORNEYS

Oct. 26, 1965  J. H. WORTHEN  3,213,625
PRECISION ADJUSTING APPARATUS
Filed June 4, 1964  4 Sheets-Sheet 2

INVENTOR.
JOHN H. WORTHEN
BY
Brumbaugh, Free, Graves & Donohue
his ATTORNEYS

Oct. 26, 1965    J. H. WORTHEN    3,213,625
PRECISION ADJUSTING APPARATUS
Filed June 4, 1964    4 Sheets-Sheet 3

INVENTOR.
JOHN H. WORTHEN

Oct. 26, 1965    J. H. WORTHEN    3,213,625
PRECISION ADJUSTING APPARATUS
Filed June 4, 1964    4 Sheets-Sheet 4

INVENTOR.
JOHN H. WORTHEN
BY
Brumbaugh, Free, Graves & Donohue
his ATTORNEYS 3,213,625
PRECISION ADJUSTING APPARATUS
John H. Worthen, Warwick, R.I., assignor to Federal Products Corporation, Providence, R.I., a corporation of Rhode Island
Filed June 4, 1964, Ser. No. 372,514
13 Claims. (Cl. 60—54.5)

This invention relates to precision adjusting apparatus and, more particularly, to a new and improved apparatus for accurately positioning an element which may be subjected to very large forces.

In the machine tool field, for example, fine adjustments must be made in the relative position of the workpiece and the abrading element to control a metal removal operation so as to obtain a finished article of correct size. After the machine tool has been adjusted to obtain a finished article of desired size, there will be variations in the size of the individutl articles produced (in addition to the statistical variations inherent in any system) for two reasons: the expansion of the workpiece and abrading element due to the heat generated in the abrading operation and the wear of the abrading element. Therefore, in order to keep the finished articles within the desired tolerance figures, adjustments must be made in the relative position of the workpiece and the abrading element.

If the finished articles must be within very close tolerances, the adjusting apparatus must be capable of displacing the adjusted element in very small increments and these individual increments must be accumulated within the desired range. In a centerless grinder, for example, the adjusted element might be either the grinding wheel or the regulating wheel. Prior art adjusting devices perform poorly under conditions of great load, because these devices are compressed or deflected rather than the element to be adjusted. Another difficulty with a conventional adjusting device is that it absorbs potential energy as it deflects, and after additional "increments" are fed to the device, the adjusted element has a tendency eventually to jump and overshoot the desired displacement.

These disadvantages are present in prior art adjusters because they are not sufficiently "stiff." Stiffness refers to the degree by which the adjuster resists deflection as the load is increased. Ideally, all the displacement required by the machine element to be adjusted would be supplied by the adjuster regardless of the load. If motion of the adjusted element does not take place, there should be a very fast buildup of force applied thereto, and if motion does take place, there should be a very fast reduction of force.

Accordingly, it is an object of the present invention to provide a new and improved precision adjusting apparatus which effectively overcomes the above-mentioned shortcomings of conventional apparatus.

Another object of the invention is to provide an adjusting apparatus having a high degree of stiffness and capable of exerting very large forces.

A further object of the invention is to provide an adjusting apparatus capable of displacing an element to be adjusted by very small increments in a cumulative manner under conditions of great load.

Still another object is to provide an adjusting apparatus having the above-mentioned advantages and susceptible to incorporation in an automated machine tool.

These and other objects of the invention are attained by a novel combination of a mechanical drive coupled to a hydraulic system, the hydraulic system requiring a minimum of hydraulic fluid, and including novel means for providing a restoring force. The hydraulic system enables the apparatus to exert larger forces than would be possible with only a mechanical drive, and the arrangement by which the volume of hydraulic fluid is minimized provides the overall apparatus with a high degree of stiffness. This combination permits adjustments to be made by increments as small as desired, and the individual increments may be accumulated under conditions of great load.

Further objects and advantages of this invention will be apparent from a reading of the following detailed description in conjunction with the accompanying drawings showing preferred embodiments, wherein.

Figure 1:
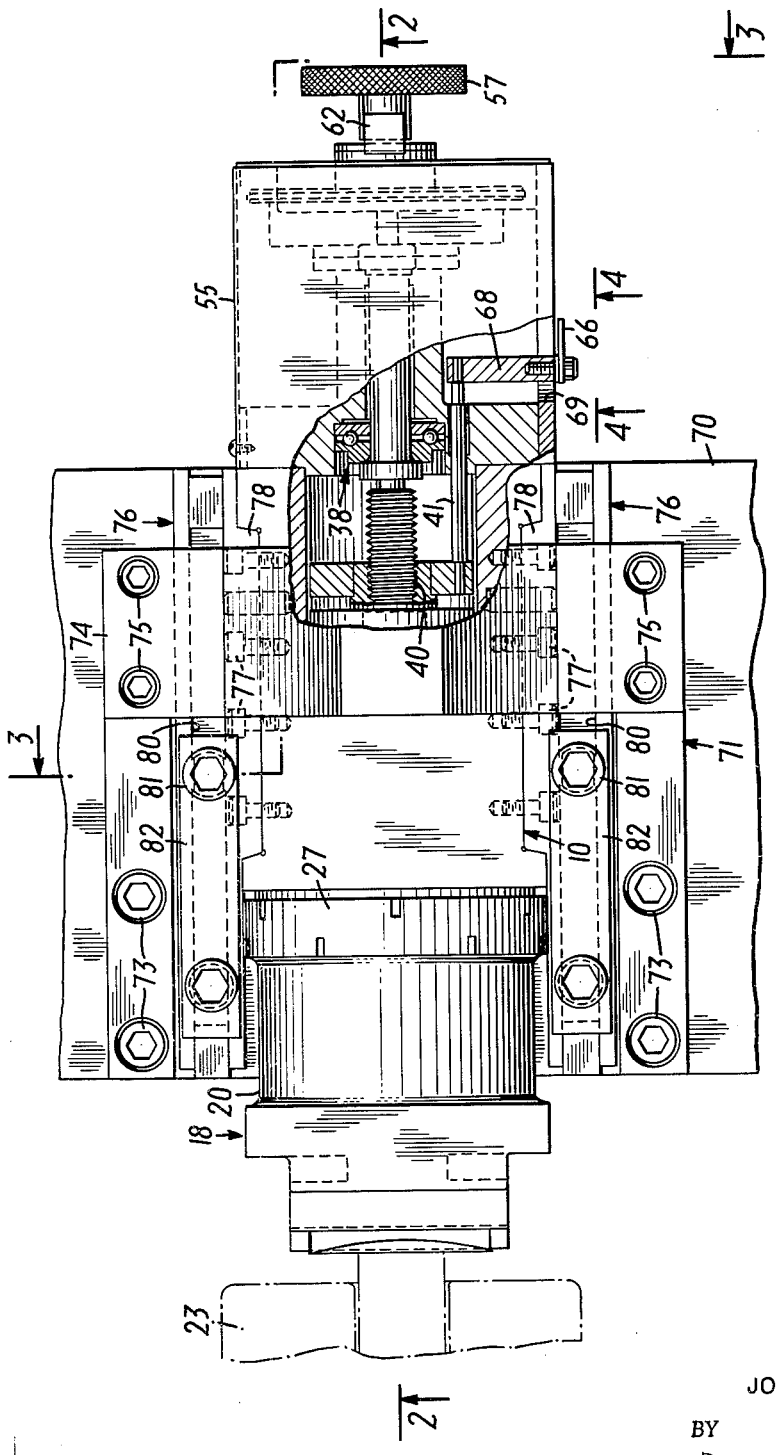
FIG. 1 is a plan view, partly broken away, of a typical precision adjusting apparatus in accordance with the invention.

In the typical embodiment of the invention shown in FIGS. 1–4, a housing 10 includes a barrel 11 formed into a relatively large cylinder 12, medium cylinder 13 and small cylinder 14. A piston 15 is disposed to slide loosely within the cylinder 13. Integrally formed with the piston 15 is a smaller piston 16 which makes a fluid-tight seal with the cylinder 14 by means of an O-ring seal 17, preferably of elastomeric material.

One end of the barrel 11 is closed by a cap structure or end block 18 comprising an end piece 19 and an annular wall or shell 20. The end piece 19 has an outwardly facing concave surface 21, permitting appropriate rockers 22 to be used to assure application of force over a large surface of the machine tool element 23 to be adjusted. Recesses 24 are provided in the end piece 19 for receiving jaws, bolt heads, nuts, or the like (not shown) used to secure the end piece to the machine element 23. The end of the shell 20 remote from the end piece 19 is threaded at 25 with left-hand threads, for example, and a cooperating outer surface of the barrel 11 is threaded at 26 with right-hand threads, for example, so that the cap structure 18 may be secured to the barrel 11 by an appropriately internally threaded collar 27, and an O-ring seal 28, preferably of elastomeric material, provides a fluid-tight seal between the cap structure 18 and the barrel 11 near the junction of the shell 20 and the end piece 19.

There is a floating collar 29 which makes a fluid-tight seal between the piston 15 and the cylinder 12 by means of a pair of O-ring seals 30 and 31. A centering collar 32 secured to the piston 15 by a press fit, for example, maintains this piston in axial alignment. In this regard, a clearance of approximately 0.010–0.015 inch, for example, is provided between the piston 15 and the cylinder 13, and also between the piston 16 and the cylinder 14, with the exception of the flange portion 16a adjacent the O-ring seal 17, this flange being provided to prevent extrusion of the O-ring which might occur due to the high pressures obtaining to the left of the O-ring (as viewed in FIG. 2), as will be explained presently.

A hydraulic chamber is defined by the inner surface of the cap structure 18, the end surface of the barrel 11, the O-ring seals 17 and 28, the cylinder 14, and the outer face of the piston 16. A hydraulic fluid of very high bulk modulus completely fills this hydraulic chamber. The same fluid fills the space defined by the pistons 15 and 16, the barrel 11, the O-ring seal 17 and the collar 29.

At the end of the barrel 11 remote from the cap structure 18 is an end housing 34 which is secured to the barrel by a plurality of screws 35. A drive shaft 36 is received coaxially in the housing 34 so as to rotate freely therein. The shaft 36 has a collar 37 which abuts against a roller bearing 38 which is received in a recess 39 formed in the housing 34. One end of the drive shaft 36 threadedly engages the piston 15 as at 40. There are 10 threads per inch so that one revolution of the drive shaft displaces the pistons 15 and 16 by 0.1 inch. Rotation of these pistons is prevented by a rod 41, which is secured to the collar 32 and is slidably mounted in the end housing 34, as best seen in FIG. 1.

The drive shaft 36 is driven through a differential gear arrangement 42, which includes a fixed gear 43 (having 100 teeth, for example) secured against relative rotation to the housing 34 by a pin 44. A planet pinion 45 engages both the fixed gear 43 and a rotating gear 46 (having 99 teeth, for example) which may be coupled to the drive shaft 36 by a pin 47 disposed in a slot 48 in the drive shaft. With the pin 47 in the position seen in FIG. 2, relative rotational movement is prevented between the rotating gear 46 and the drive shaft 36. The planet pinion 45 is carried by a pin 49 which is received in a bore 50 in a disc 51, which in turn is secured to a sprocket 52 by a plurality of screws 53. The sprocket 52 is coupled to any suitable drive mechanism (not shown) by a chain 54. A cover 55, which is secured to the end housing 34 by a plurality of screws 56, protects the differential gear arrangement 42 and the parts associated therewith from dust, dirt, metal filings and the like.

A wheel 57 is secured to a shaft 58 by a pin 59, the shaft carrying the pin 47 and being slidable within a bore 60 in the drive shaft 36. An annular recess 61 formed in the disc 51 permits the pin 47 to be disengaged from the rotating gear 46 by sliding the shaft 58 to the right as viewed in FIG. 2. The pin 47 may be prevented from becoming accidentally disengaged from the rotating gear 46 by a stop slide 62 slidably mounted on a collar 63 secured to the drive shaft 36, the stop slide 62 being provided with a slot 64 having a circular portion of diameter greater than that of the shaft 58 and an elongated portion of width less than the diameter of this shaft. An annular groove 65 in the shaft 58 is adapted to receive the opposed edges of the elongated portion of the slot 64, as illustrated in FIG. 3, whereby relative axial movement between the shafts 36 and 58 is prevented.

In order to withdraw the pin 47 from the moving gear 46, the stop slide 62 must be lifted so that the shaft 58 may slide through the circular portion of the slot 64. When the pin 47 is withdrawn from the gear 46, the drive shaft 36 may be rotated directly by the wheel 57, whereby rough adjustments may be made in the displacement of the machine element 23, these rough adjustments being indicated by a pointer 66 on a scale 67 (which may be graduated in thousandths of an inch) on the outside of the cover 55. The pointer 66 is fixed to an arm 68 extending through a slot 69 in the cover 55.

The housing 10 is clamped to a foundation or bed 70 within a yoke structure 71, which includes a pair of lateral blocks 72, secured to the bed 70 by a plurality of screws 73, and a bridge member 74 secured to the blocks 72 by a plurality of screws 75. A pair of guide members 76 are secured to opposite sides of the housing 10 by a plurality of screws 77, each guide member having a wedge portion 78 adapted to fit snugly with a mating surface of the housing 10 to prevent any relative longitudinal movement between the guide members 76 and the housing 10. A pair of guide posts 79 are mounted in the bed 70 on opposite sides of the housing 10, and the guide posts extend through longitudinal slots 80 in the guide members 76, so that the housing 10 may be releasably secured to the bed 70 by a plurality of cap nuts 81 which engage the free ends of the guide posts 79, a pair of blocks 82 being disposed between the cap nuts 81 and the guide members 76.

In operation, the housing 10 is secured with relation to the bed 70, or the bed 70 is adjusted with respect to the base structure 70a, so that the wheel 57 may be employed (the pin 47 being disengaged from the rotating gear 46) to place the machine element 23 in an appropriate position for beginning a metal removal operation, reference being made to the indicator 66 and scale 67 to insure that the range of the adjusting apparatus will not be exceeded. The shaft 58 is then secured in the position shown in FIG. 2 by the stop slide 62, so that the sprocket 52 is coupled to the drive shaft 36 through the differential gear arrangement 42.

Any suitable gaging system (not shown) for the workpiece indicates whether the machine element 23 must be displaced in order to bring the workpiece down to finished size or in order to compensate for the above-mentioned effects of expansion of the workpiece and wear of the abrading element. This information is relayed by suitable means known to the art to a drive mechanism connected to the chain 54 so that the sprocket 52 is rotated as necessary. Inasmuch as there is a 100 to 1 reduction through the differential gear arrangement 42 and there are 10 threads per inch in the threaded engagement between the drive shaft 36 and the piston 15, one revolution of the sprocket 52 displaces the pistons 15 and 16 by 0.001 inch.

Figure 2:
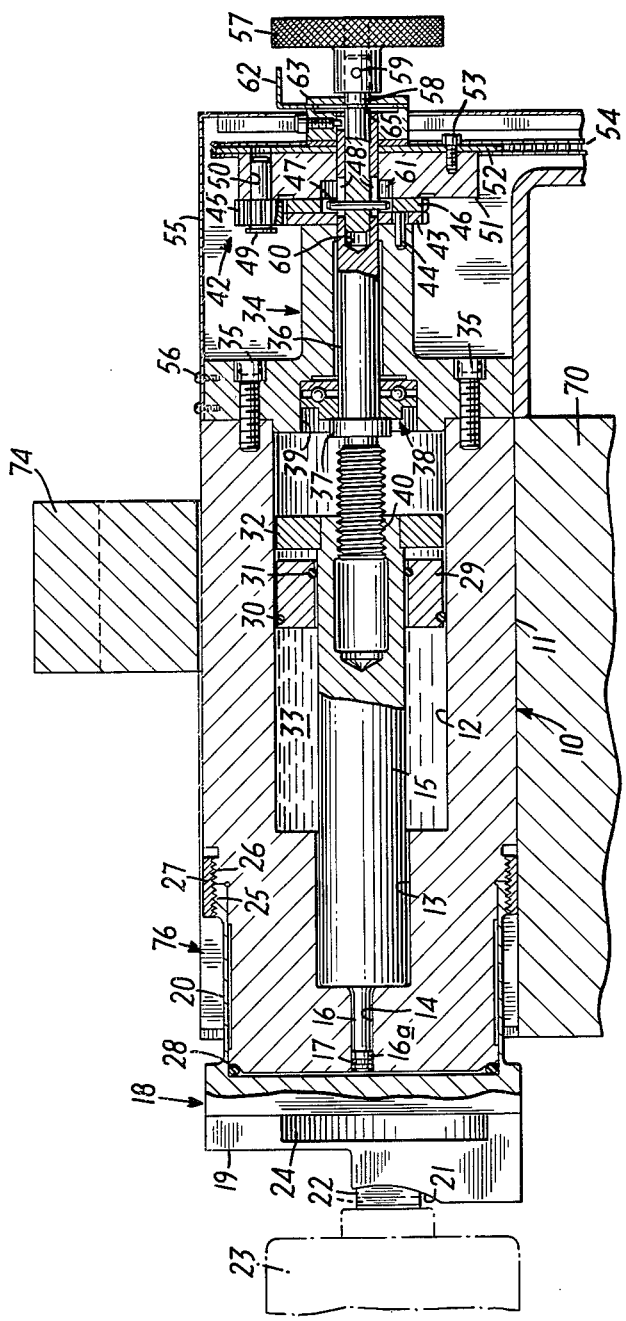
FIG. 2 is a side elevational view in section taken in a plane indicated by the line 2—2 of FIG. 1 and looking in the direction of the arrows.
Figure 3:
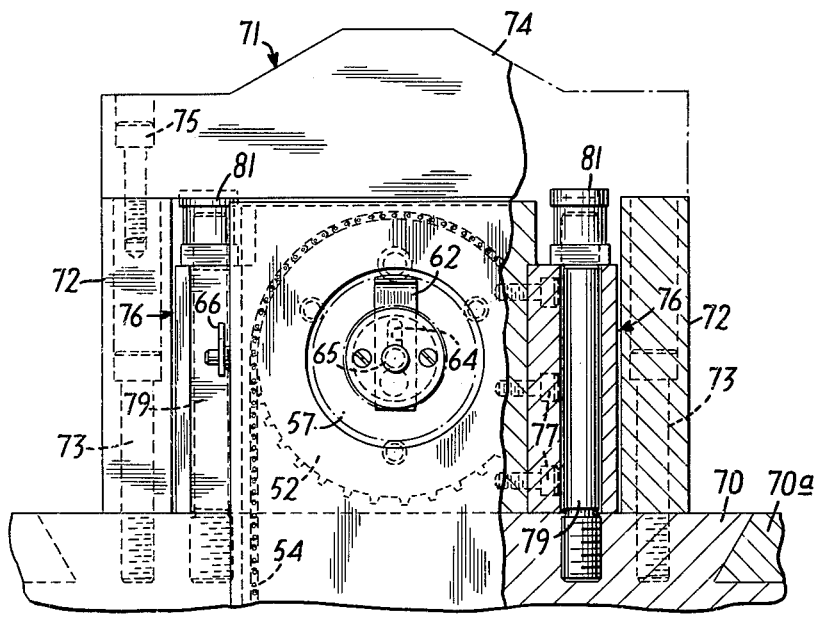
FIG. 3 is a view in front elevation, partly in section, taken in a plane indicated by the line 3—3 of FIG. 1 and looking in the direction of the arrows.
Figure 4:
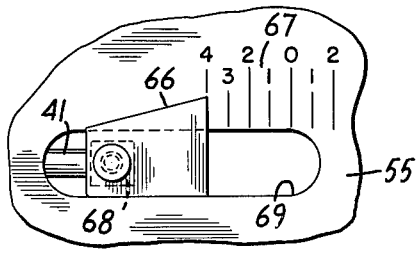
FIG. 4 is an enlarged partial view in elevation taken in a plane indicated by the line 4—4 of FIG. 1 and looking in the direction of the arrows.

As the piston 16 is displaced to the left as viewed in FIG. 2, the hydraulic fluid is pumped between the end face of the barrel 11 and the inner surface of the end piece 19 and forces the end piece away from the barrel, whereby the machine tool element 23 (secured to the end piece 19) is displaced. The length of travel permitted the piston 16 might be one inch, during which travel the distance between the inner surface of the end piece 19 and the end face of the barrel 11 might vary between 0.001 and 0.007 inch, providing a range of adjustment for the element 23 of 0.006 inch. FIG. 2 shows the piston 16 fully displaced to the left.

The O-ring seal 17 prevents the escape of hydraulic fluid from the hydraulic chamber between the piston 16 and the cylinder 14. The hydraulic fluid in the chamber 33 between the collar 29 and the O-ring seal 17 performs no function during the operation of the adjusting apparatus. As the pistons 15 and 16 are displaced with respect to the barrel 11, the collar 29 slides relative to the piston 15 and the barrel 11 as required by the flow of the fluid in the chamber 33, sufficient clearance being provided between the piston 15 and the cylinder 13 to permit the free flow of fluid therebetween. There is hydraulic fluid in the chamber 33 because the components of the adjuster are assembled while immersed in the fluid in order to prevent air from being trapped in the hydraulic chamber to the left of the O-ring seal 17 (as viewed in FIG. 2). Furthermore, the chamber 33 serves as a reservoir from which the fluid in the hydraulic chamber may be replenished, should there be leakage over a long period of time past either of the O-rings 17 and 28. The replenishment may be readily accomplished by displacing the pistons 15 and 16 to the extreme right (as viewed in FIG. 2), whereby the O-ring 17 is withdrawn from the cylinder 14, permitting fluid to flow from the chamber 33 to the hydraulic chamber as needed.

As the end piece 19 is driven to the left, the annular shell 20 is stretched, thereby providing a restoring force (in addition to any load on the element 23) which urges the cap structure 18 against the barrel 11. The shell 20 is preferably of high-stress-withstanding machine steel, so that the end piece 19 may be displaced within the 0.006 inch range indefinitely without reaching the elastic limit of the shell. By operating the adjuster within a range over which the shell 20 is always stretched to some degree, accurate adjustment may be made in the element 23 in either axial direction.

The O-ring seal 28 prevents the escape of the hydraulic fluid from the hydraulic chamber into the space between the shell 20 and the barrel 11. This space is provided to insure that the operation of the adjuster is not adversely affected by friction between the shell and the barrel. By preventing the fluid from entering therebetween, the stress in the shell 20 is only longitudinal, i.e. is caused only by the stretching of the shell due to the displacement of the end piece 19. If hydraulic fluid under pressure were permitted "behind" the shell, there would be circumferential stress in the shell which would be considerably greater than the longitudinal stress. This would reduce the range of displacement permitted by the end piece in order to stay below the elastic limit of the shell. Furthermore, the amount of fluid required to displace the end piece is minimized by preventing any fluid from entering behind the shell. This improves the degree of stiffness of the adjuster, inasmuch as there is a minimum volume of fluid to be compressed.

In a practical example of the embodiment of the invention illustrated in FIGS. 1–4, the annular shell 20 might have a thickness of 0.050 inch and the hydraulic chamber might contain about 0.1 cubic inch of hydraulic fluid. The hydraulic fluid is preferably of very high bulk modulus; for example, the glycol base hydraulic fluid of E. F. Houghten No. 620, having a bulk modulus of 319,000 pounds per square inch, provides excellent performance. This adjusting apparatus is capable of exerting forces as high as 60,000 pounds in either direction.

As the end piece 19 moves to the right as viewed in FIG. 2, the O-ring seal 28 is deformed, so that there is no sliding action and consequent friction between this seal and the surfaces of the end piece 19 and the barrel 11 with which it is in contact.

Inasmuch as one revolution of the sprocket 52 displaces the pistons 15 and 16 by 0.001 inch and a one-inch displacement of piston 16 effects a 0.006 inch displacement of the end piece 19 (which is coupled to the machine element 23), one revolution of the sprocket 52 displaces the end piece 0.000006 inch. Of course smaller increments of displacement may be obtained by rotating the sprocket 52 a fraction of a revolution. The increments may be accumulated to obtain the necessary displacement of the element 23 because of the high degree of stiffness of this adjuster, which is attained by minimizing the volume of hydraulic fluid and by driving the pistons 15 and 16 by an entirely mechanical drive system. Another suitable mechanical drive, such as a simple gear reduction arrangement, might be used to displace the pistons 15 and 16, but it is important that a direct mechanical drive be employed rather than a hydraulic system, the former being considerably stiffer than the latter.

The shell 20 not only provides a restoring force so that the apparatus is capable of exerting very large forces in opposite directions, but it also minimizes the extent by which the element 23 might overshoot the desired increment of displacement, should the element 23 stick or jam and the force exerted thereon be increased until motion finally takes place.

Although the embodiment of the invention illustrated in FIGS. 1–4 is adapted to be used with a fully automated machine tool, it is apparent that it could be employed manually by coupling a hand wheel to the sprocket 52, for example.

Figure 5:
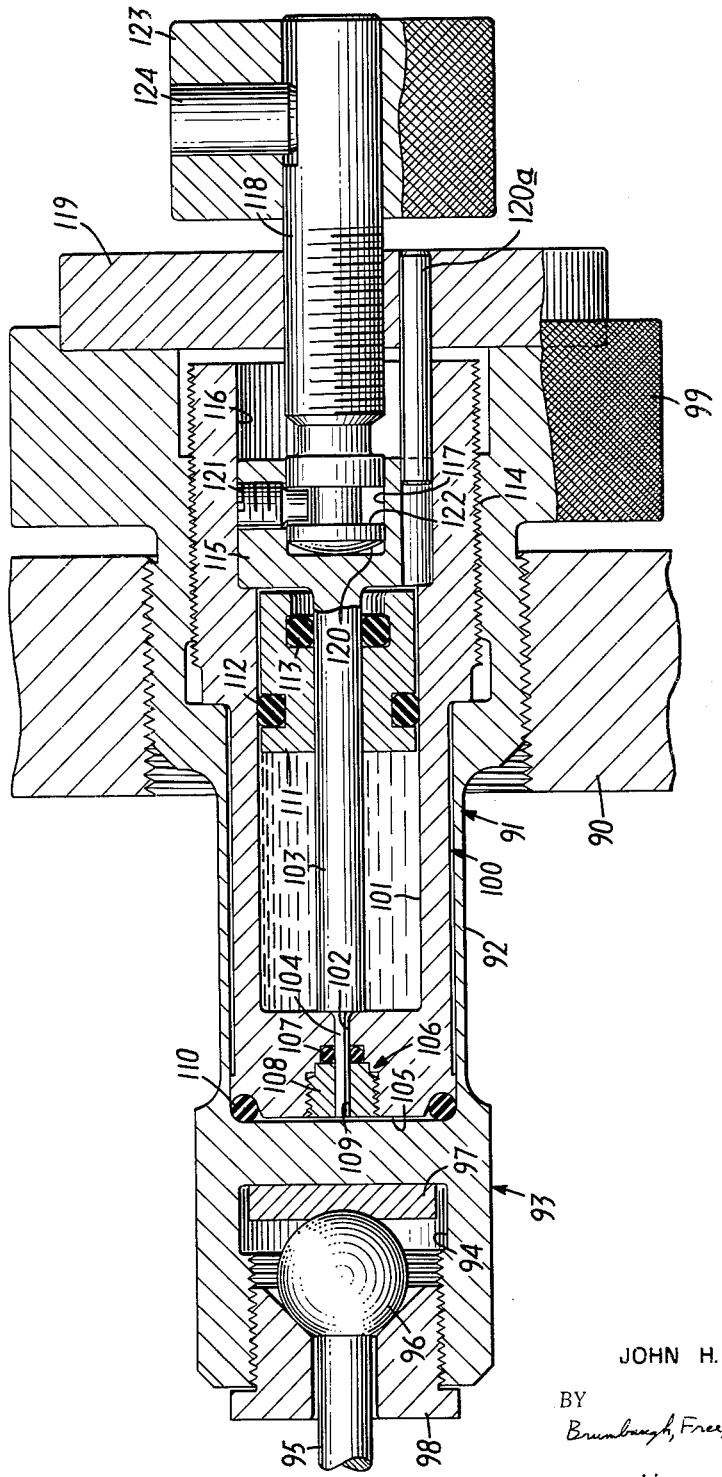
FIG. 5 is a side elevational view in section illustrating another embodiment of the invention.

Another embodiment of the invention is shown in FIG. 5. A base structure 90 threadedly receives a housing 91 of generally cylindrical shape which is formed with a lateral wall including a cylindrical shell 92 of relatively narrow thickness closed by an end block structure 93. The end block 93 is provided with a recess 94 for receiving a rod 95 coupled to a machine element (not shown) to be adjusted. A knob 96 formed on one end of the rod 95 bears against a block 97 seated in the recess 94, and may be locked against the block 97 by a collar 98 which is threadedly received in the recess 94. The end of the housing 91 remote from the end block 93 is formed with a lateral flange 99, the periphery of which may be knurled for convenience, which serves as a coarse adjustment knob for displacing the housing 91 axially with respect to the base 90.

Disposed within and in close-fitting relation to the housing 91 is a generally cylindrical body 100. The body 100 is provided with a relatively large bore 101 which communicates with a relatively small bore 102. Disposed coaxially within the cylindrical body 100 is a rod 103, integrally formed on one end of which is a piston 104 which is slidably received in the bore 102. The end surface 105 of the body 100 adjacent the end block 93 is recessed at 106 to seat an O-ring seal 107, preferably of elastomeric material, in order to provide a fluid-tight seal between the piston 104 and the cylindrical body 100. A collar 108 having a bore 109 therethrough is threadedly received in the recess 106, the collar preferably being of hardened steel so that the bore 109 may be machined to insure a smooth sliding action between the piston 104 and the collar 108.

The space between the end surface 105 of the cylindrical body and the adjacent surface of the end block 93 forms a hydraulic chamber which contains a hydraulic fluid, preferably of very high bulk modulus. An elastomeric O-ring seal 110 generally at the periphery of the end surface 105 prevents the escape of hydraulic fluid from the hydraulic chamber between the shell 92 and the body 100.

As in the first embodiment, the hydraulic fluid is also present in the space between the O-ring seal 107 and a floating collar 111 which is free to slide with respect to both the rod 103 and the body 100, a pair of O-ring seals 112 and 113 preventing escape of fluid past the collar 111. As before, minute losses of fluid from the hydraulic chamber which may occur by leakage past the O-rings 107 and 110 may be replenished by displacing the rod 103 and the piston 104 to the extreme right (as viewed in FIG. 5).

The housing 91 is threadedly secured to the body 100 remote from the end block 93, as at 114, the threaded engagement being employed at 114 merely to facilitate the initial assembly of the apparatus.

Integrally formed with the rod 103, at the end thereof remote from the piston 104, is a lateral flange 115 which is slidably received in close-fitting relation to a bore 116 in the body 100. The flange 115 is recessed at 117 to receive one end of a drive screw 118, which is threadedly received in a block 119 which in turn is secured to the housing 91 by a press fit or suitable screws (not shown), for example. The end of the drive screw within the recess 117 is provided with a rounded surface 120 adapted to bear against the rod 103, so that the rod 103 and the piston 104 may be driven to the left to the extreme position illustrated in FIG. 5 by rotation of the drive screw in the appropriate direction. Rotation of the rod 103 and the piston 104 is prevented by a rod 120a, which is mounted in the block 119 and is slidably received in the flange 115. The piston may be withdrawn, or moved to the right, since a pin 121 carried by the flange 115 extends into an annular groove 122 formed in the drive screw. An adjustment knob 123, the periphery of which may be knurled for convenience, is secured against relative rotation to the drive screw 118 by a pin 124 and permits the drive screw to be readily rotated as desired.

The operation of the embodiment of the invention shown in FIG. 5 is very similar to that of the first embodiment. A coarse adjustment of the rod 95 may be made by rotation of the coarse adjustment knob 99 to an accuracy of 0.0001 inch, for example. Then the necessary fine adjustment is made by rotation of the fine adjustment knob 123, whereby the rod 95 may be adjusted over a range of 0.001 inch to an accuracy of 0.000001 inch, for example. As the piston 104 is driven to the left, hydraulic fluid is pumped into the space or chamber between the end block 93 and the end surface 105, thereby displacing the end block 93 to the left and stretching the cylindrical shell 92, which provides a restoring force as before.

Although this invention has been described with reference to specific embodiments, modifications and variations will readily occur to those skilled in the art. Therefore, the invention is not to be construed as limited to the specific embodiments described, but all such variations and modifications are included within the intended scope of the invention as defined by the following claims.

I claim:
1. Precision adjusting apparatus comprising
 a cylinder,
 a piston slidably disposed in the cylinder,
 a cap mounted over one end of the cylinder, the cap being displaceable with respect to the cylinder and adapted to be coupled to an element to be adjusted, the cap, cylinder and piston defining a chamber adapted to receive a fluid,
 means to urge the cap against the cylinder, and
 mechanical drive means connected to the piston for displacing the piston with respect to the cylinder.
2. Apparatus according to claim 1 including first sealing means between the cap and the cylinder adapted to prevent escape of fluid therebetween from the chamber.
3. Apparatus according to claim 1 including second sealing means between the cylinder and the piston for preventing escape of fluid therebetween from the chamber.
4. Apparatus according to claim 1 wherein the urging means includes an annular shell disposed externally of the cylinder, one end of the shell being secured to the cap, the other end of the shell being secured to the cylinder.
5. Apparatus according to claim 1 wherein the cap includes a cylindrical block, and the urging means includes an annular shell integrally formed at one end with the periphery of the cylindrical block, the end of the shell remote from the block being secured to the cylinder.
6. Precision adjusting apparatus comprising
 a first cylinder,
 a piston slidably disposed in the first cylinder,
 a second cylinder disposed concentrically of and in close-fitting relation over the first cylinder, the second cylinder having a lateral wall and an end block, the lateral wall being secured to the first cylinder remote from the end block and being adapted to be stretched in a direction parallel with the axis of the second cylinder, the end block being adapted to be coupled to an element to be adjusted, the end block, first cylinder and piston defining a chamber adapted to receive a fluid, and
 mechanical drive means connected to the piston for displacing the piston with respect to the first cylinder.
7. Apparatus according to claim 6 including first sealing means between the first and second cylinders substantially at the junction of the lateral wall and the end block adapted to prevent the entrance of fluid between the lateral wall and the first cylinder from the chamber.
8. Apparatus according to claim 6 including second sealing means between the first cylinder and the piston for preventing escape of fluid therebetween from the chamber.
9. Precision adjusting apparatus comprising
 a first cylinder having an end surface provided with a bore,
 a piston slidably disposed in the bore,
 a second cylinder disposed coaxially of and in close-fitting relation around the first cylinder, the second cylinder including an end block and a lateral cylindrical shell adapted to be stretched coaxially of the second cylinder, the end block adapted to be coupled to an element to be adjusted, the inner surface of the end block, the end surface of the first cylinder and the free end of the piston defining a chamber, the first and second cylinders being secured to each other remote from the end block,
 a fluid in the chamber, and
 mechanical drive means connected to the piston.
10. Apparatus according to claim 9 wherein the mechanical drive means displaces the piston with respect to the first cylinder, and also including means for axially adjusting the first cylinder with respect to a base structure in which the apparatus is adapted to be mounted.
11. Apparatus according to claim 9 including first sealing means in the bore for preventing escape of fluid from the chamber between the piston and the first cylinder.
12. Apparatus according to claim 9 including second sealing means disposed generally at the periphery of the end surface of the first cylinder for preventing escape of fluid from the chamber between the first and second cylinders.
13. Precision adjusting apparatus comprising
 a housing having a end block and a lateral cylindrical shell adapted to be coaxially stretched, the end block adapted to be coupled to an element to be adjusted,
 a cylinder disposed within the housing in close-fitting relation to the lateral shell thereof so as to form a chamber adapted to contain fluid between the end block and the cylinder, the cylinder being provided with a bore therethrough, the housing being secured to the cylinder remote from the end block,
 a piston slidably disposed in the bore, and
 mechanical drive means connected to the piston.

No references cited.

JULIUS E. WEST, *Primary Examiner.*